United States Patent [19]

Murtha et al.

[11] Patent Number: 4,642,710

[45] Date of Patent: Feb. 10, 1987

[54] ANIMATED DISPLAY CONTROLLED BY AN AUDIO DEVICE

[75] Inventors: Eugene A. Murtha, Simsbury, Conn.; Mark B. Johnson-Williams, East Longmeadow, Mass.; Theodore N. Madison, Windsor, Conn.; Michael C. Cartabiano, Agawam, Mass.

[73] Assignee: Milton Bradley International, Inc., Springfield, Mass.

[21] Appl. No.: 712,382

[22] Filed: Mar. 15, 1985

[51] Int. Cl.⁴ .................. G11B 31/00; G09F 27/00
[52] U.S. Cl. ................................. 360/79; 369/64; 340/725; 340/784; 340/815.11; 40/448; 40/457; 446/175; 446/302
[58] Field of Search ............ 360/79, 80; 352/87; 369/19, 20, 69, 70, 64, 65, 63; 381/110, 104; 40/447, 448, 457, 421, 455, 902, 906; 364/410, 513; 340/815.1, 815.11, 706, 765, 784, 691, 725; 901/1, 50; 273/1 E, 1 GC; 434/256, 257, 308-310, 316, 321, 393; 367/197, 198; 446/301, 302, 321, 484, 175

[56] References Cited

U.S. PATENT DOCUMENTS

| | | | |
|---|---|---|---|
| 2,867,049 | 1/1959 | Brackensey | 40/457 |
| 3,287,849 | 11/1966 | Weiss | 360/79 |
| 3,440,349 | 4/1969 | Gibbs | 340/691 |
| 3,579,855 | 5/1971 | Worthy et al. | 434/308 |
| 3,662,374 | 5/1972 | Harrison, III et al. | 40/457 |
| 3,797,012 | 3/1974 | Gibbs et al. | 340/815.1 |
| 3,912,694 | 10/1975 | Chiappe et al. | 360/79 |
| 4,104,625 | 8/1978 | Bristow et al. | 340/318 |
| 4,107,462 | 8/1978 | Asija | 381/110 |
| 4,139,968 | 2/1979 | Milner | 446/301 |
| 4,177,589 | 12/1979 | Villa | 40/457 |
| 4,207,704 | 6/1980 | Akiyama | 360/79 |
| 4,260,229 | 4/1981 | Bloomstein | 352/87 |
| 4,305,131 | 12/1981 | Best | 364/410 |
| 4,415,153 | 11/1983 | Yokoi | 273/1 GC |
| 4,451,911 | 5/1984 | Klose et al. | 364/64 |
| 4,521,205 | 6/1985 | Spector | 446/302 |

FOREIGN PATENT DOCUMENTS 2119994 11/1983 United Kingdom ............... 340/784

OTHER PUBLICATIONS

EDN Magazine vol. 22, No. 1, "Rose Bowl Parade Features μP—Controlled Animated Elephant", 1/77, pp. 27-28.

Washington Post, "It's Not R2-D2, but . . ." Luxenberg, May 28, 1978, p. L-12.

Xerox Disclosure Journal, "Microprocessor Data Display System", Stephany, vol. 7, No. 2, Mar./Apr. 1982, p. 77.

Primary Examiner—Raymond F. Cardillo
Assistant Examiner—Steven R. Garland
Attorney, Agent, or Firm—Ross, Ross & Flavin

[57] ABSTRACT

An animated display in the form of a representation of a face, is controlled by an associated audio tape player and a microprocessor-controlled liquid crystal display. The facial features are variable responsively to the audio signals of the tape player as controlled by the microprocessor.

1 Claim, 10 Drawing Figures

ANIMATED DISPLAY CONTROLLED BY AN AUDIO DEVICE

BACKGROUND OF THE INVENTION

1. Field of the Invention

Our invention relates to an audio tape player characterized by a display of a variety of features comprising the representation of a face, which features change responsively to audio signals from a built-in tape player and to a microprocessor control.

2. Description of the Prior Art

Systems which we have known and worked with do not allow for the animation of a facial display in combination with audio signals and a microprocessor program for controlling same.

SUMMARY OF THE INVENTION

In accordance with the invention, there is provided a simulation of a character containing therewithin a mono-type play-only tape player of the cassette type with a cooperant animated liquid crystal display in the form of a face wherein its eyes, eyebrows, and mouth appear to move in synchronization with the tape-recorded audio on the cassette tape, as transcribed by the player.

The invention offers the additional advantage of an active display, even while the tape drive has been rendered inoperative.

The apparatus has the significant advantage that it is additionally receptive to any pre-recorded or consumer-recorded cassette, special recording signals on the tape not being essential for its operation.

There is the further advantage that any of the tapes employed with the apparatus and sold as a part thereof, or made available separately as adjuncts thereof, are operable with any other commercially available tape player of the cassette type, such as sourced by Playtime Products, New York, N.Y. under the trademark "Care Bears" or by Nasta Ind.,Inc., New York, N.Y. under the trademark "Take-a-Long."

The system allows an interactive question and answer format and may be exploited for use with cooperant story and/or activity books. The interactive feature comprehends a question being asked via the tape audio with time being allowed for the user to progress at his own pace through his activity book response to such question. The question is followed by a period of silence to enable the user to answer or to perform an activity, as the case may be. The answering accomplished or the activity performed, the motor is restarted to continue the forward advance of the tape merely by the pressing of a Go button.

If the period of silence following the question exceeds a predetermined time period, the microprocessor intervenes and turns off the motor driving the tape.

The interactive mode can be disabled by moving horizontally shiftable slide switch so as to allow the use of any commercially available prerecorded cassette tape in the apparatus.

The apparatus is without the provision of an on/off button, going only into a resting mode at the termination of use. In such resting mode, the face assumes a sleeping position (i.e. eyes closed position) as the microprocessor turns itself off. That is, the display remains on, with the face appearing to be sleeping, with the LCD driver likewise remaining on.

Next following, with the pressing again of the Go button, the microprocessor is again activated and drives the display so as to initially offer the appearance of awakening from its sleep.

DESCRIPTION OF THE PREFERRED EMBODIMENT

Figure 1A:
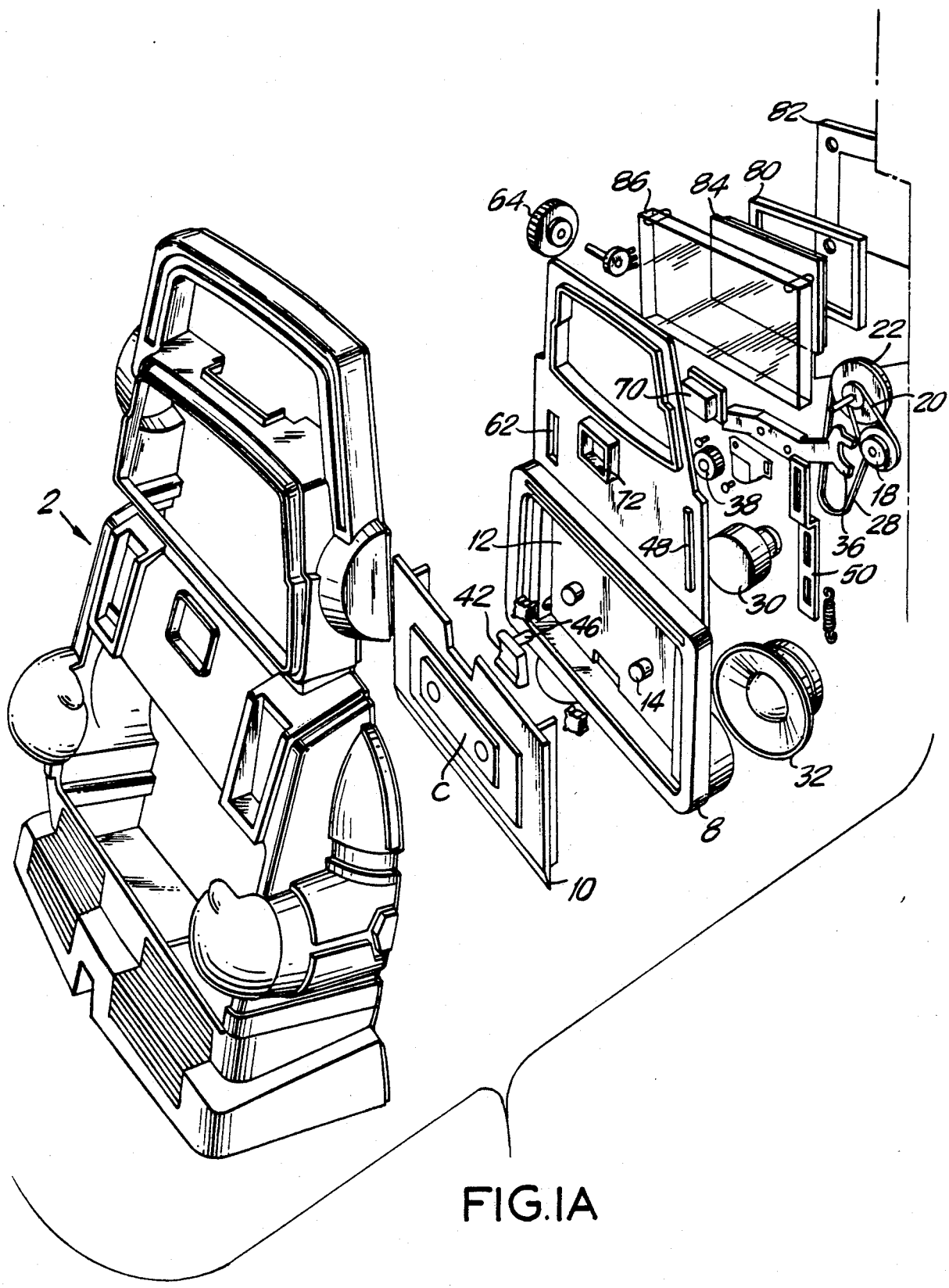
FIGS. 1A and 1B combined comprise an exploded view of the robot configuration with the associated components being shown in their relative positions therewithin.
Figure 1B:
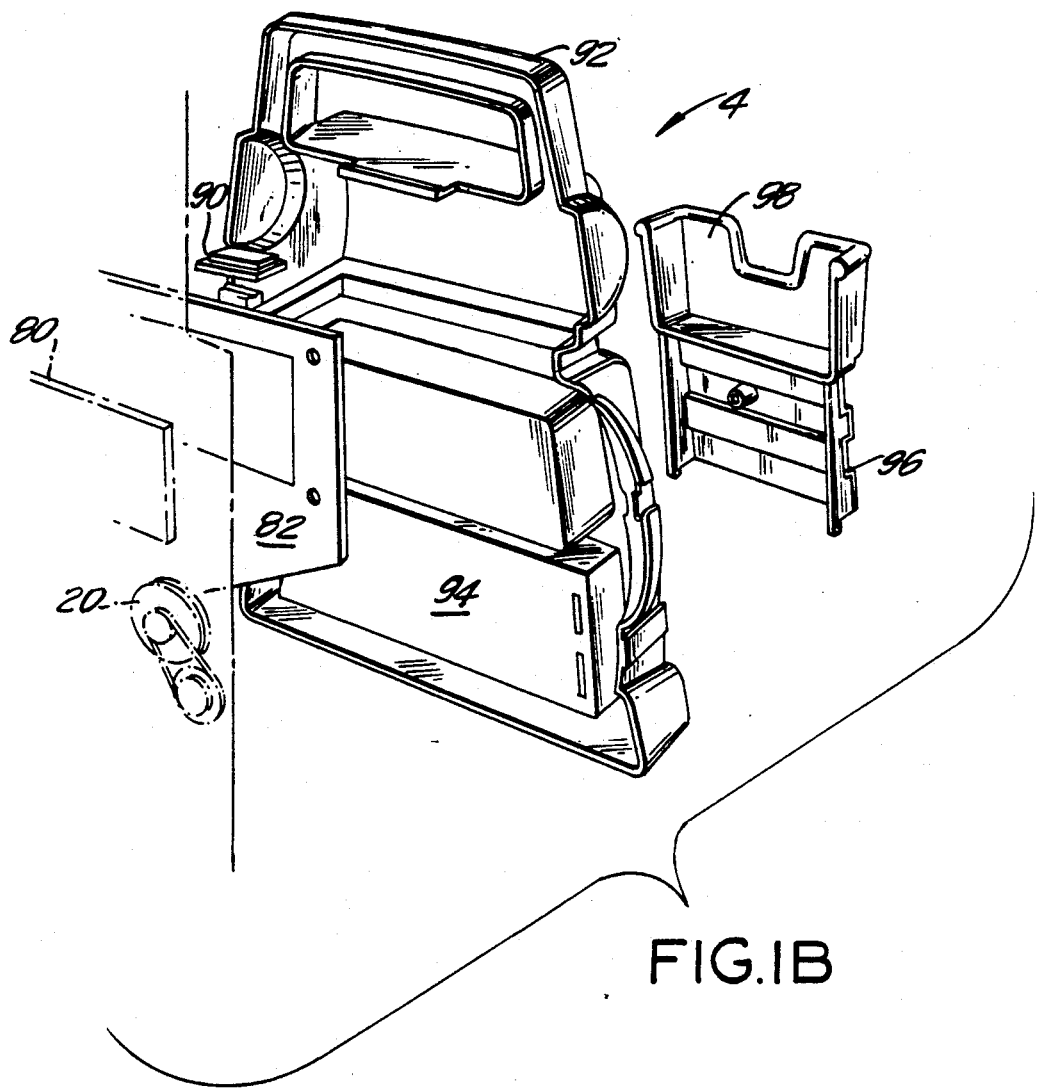

The apparatus is enclosed within a two-part body comprised of a front housing 2 and a rear housing 4, which parts may be frictionally interengaged by any conventional means in the defining of a preferentially plastic character having a tape module frame 8 fitted in the belly of the front housing and enclosed by a spring-actuated cassette-receiving door 10 hinged relative to the front housing and facilitating the ready insertion of a selected cassette relative to the door and its presentation in confrontation with tape module frame 8 as the door is manually swung into its closed position relative to the tape module frame.

Reversely, the cassette is manually withdrawn from its position in the door as the door is sprung open upon the shifting of a vertically slidable button to its eject position, as will subsequently appear.

Tape mechanism TM includes a rotatable shaft known as a take-up reel 12 which extends through the wall of the tape module frame and a fixed post 14 projects from the frame, the shaft 12 and post 14 accommodating the tape cassette C.

Also rearwardly of tape module frame 8, a take-up reel pulley 18 is mounted on take-up reel 12 and around which a take-up reel belt 20 is entrained, being also entrained around a flywheel 22.

Flywheel 22 has a drive belt 28 entrained therearound, which belt is entrained also around the drive shaft of a motor 30.

A swingable play arm 36 mounts a pinch roller 38 and a magnetic head 34 for transducing the head.

Additionally, a speaker 32 comprises the tape playing assembly.

A vertically-slidable selector button 42, mounted relative to the face of front housing 2, is provided with a rearwardly projecting finger 46 firstly extendable through a slot 48 on the rightward side of the front housing and secondly extendable through a slot in a vertically-slidable eject lever 50 located immediately rearwardly of tape module frame 8.

Selector button 42 is shiftable between operative positions identified as a ready mode and a fast forward non-play mode and non-operative positions identified as a stop mode and an eject mode.

Upwardly of tape module frame 8 on the leftward side of the front housing is a slot 60 through which a rotatable volume control wheel 62 extends to allow manual engagement thereof for imparting a rotative movement thereto. The wheel has a shaft 64 which mounts a volume potentiometer 66.

Manual rotative movement imparted to volume control wheel 62 allows accommodation to the use of any of a plurality of adjunct or commercially-available tapes which may have been recorded at different sound levels.

A centrally-located push button 70, called a "Go" or "Start" extends through an opening 72 in front housing 2 intermediate volume control wheel 62 and selector button 42.

A liquid crystal display support 80, mounted on a PC board 82, is located in front housing 2 above selector button 42, volume control wheel 62, and push button 70, and accommodates a flat panel electro-optical display 84 and a clear cover 86 forwardly of the display.

A horizontally-shiftable slide switch 90 serves to engage and/or disable the interactive question/answer mode.

An uppermost integral carrying handle 92 allows for easy portability of the apparatus.

Rear housing 4 contains therewithin a plurality of batteries 94, preferentially a series of 4 of the D cell type, access thereto being via a rearwardly-facing battery door 96 in the rear housing.

If desired, a storage pocket 98, extendable outwardly from the rear housing wall for the retaining of one or more extra cassettes, may be provided.

The LCD and addressing circuitry comprises a pair of transparent, orthogonally polarized glass panels disposed in spaced parallelism with the gap therebetween filled with a liquid crystal composition. When a voltage exceeding a certain threshold value is applied to a portion of the composition, the optical characteristics are changed in that portion of the composition resulting in a visually perceivable change in the appearance of the composition as viewed through the polarized glass unit.

The layer of liquid crystal composition is disposed in an invisible electrically-conductive matrix arranged in the form of segments representative of eyebrows, eyes and mouth in different positions suggesting different facial expressions.

The matrix is present on the surface of each glass panel facing the layer of the liquid crystal composition.

Figure 3:
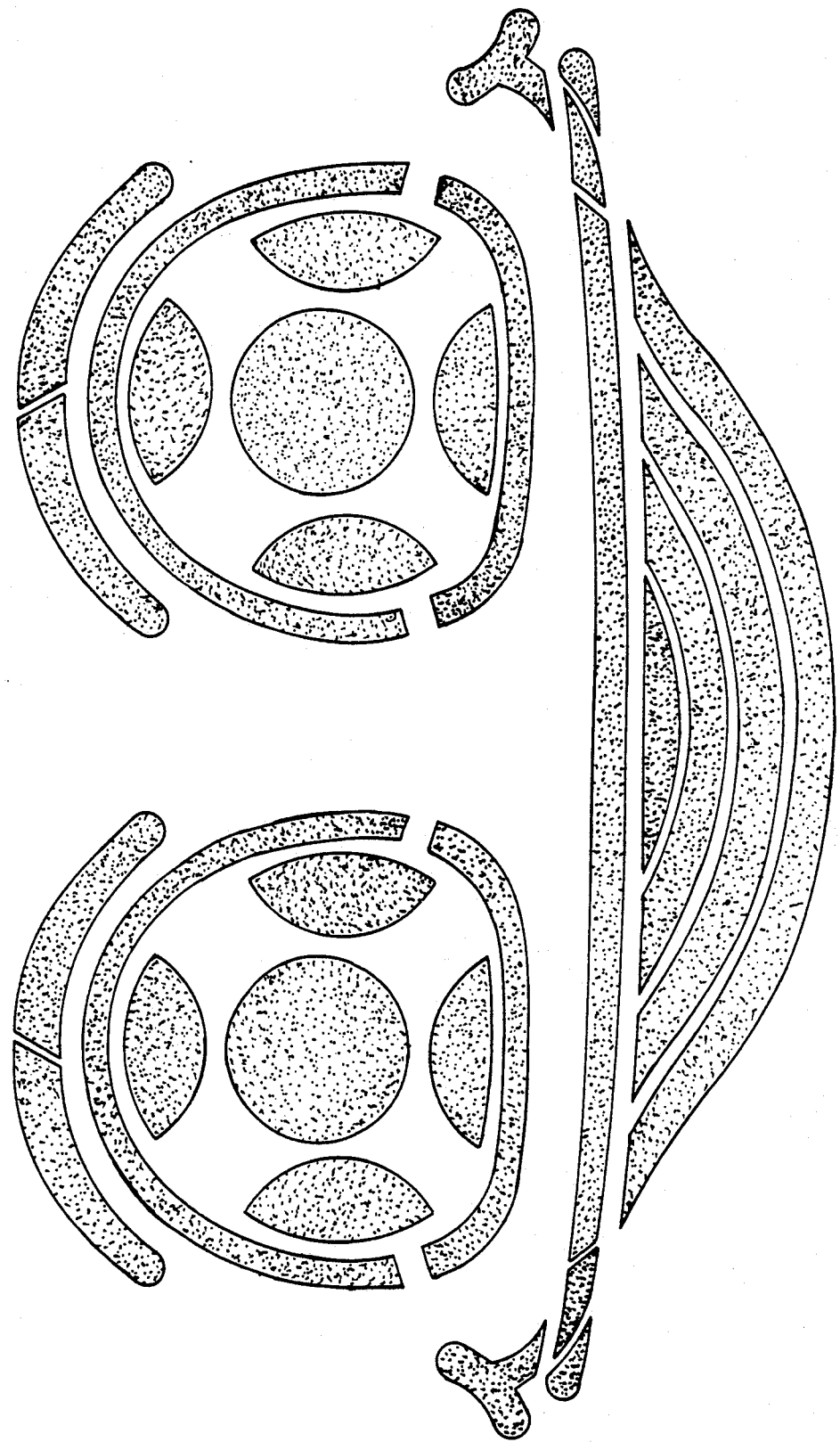
FIG. 3 is a schematic face view of the identification of the liquid display segments.
Figure 4:
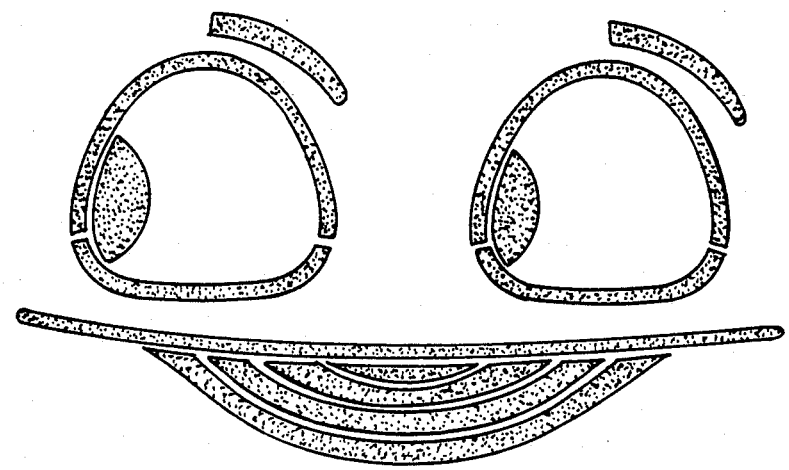
FIGS. 4-9 illustrate a random variety of the animated faces attainable with the apparatus of the invention.
Figure 5:
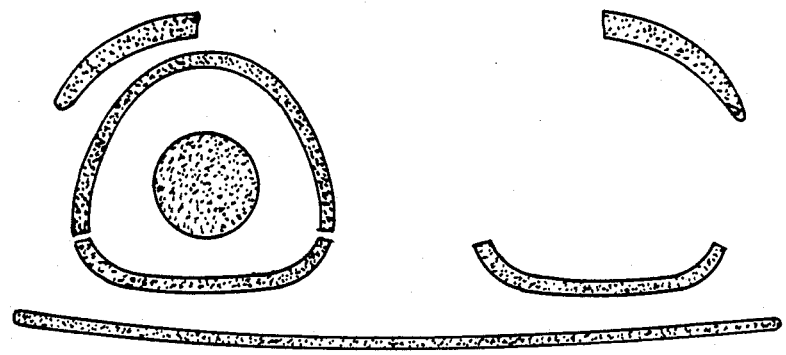
Figure 6:
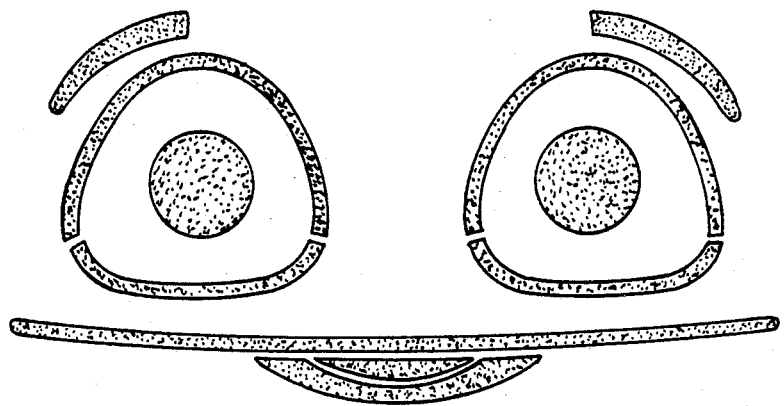
Figure 7:
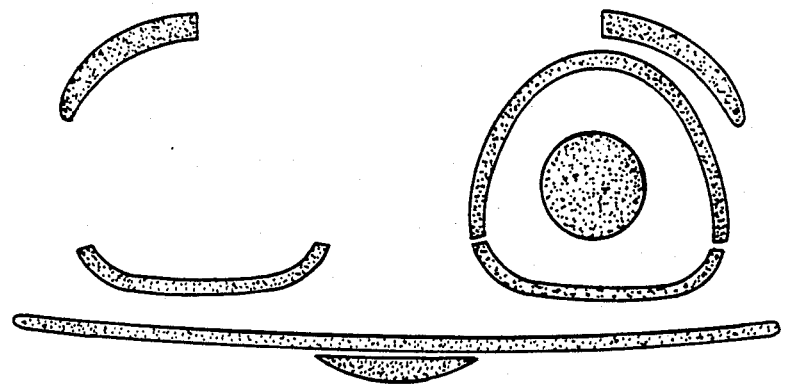
Figure 8:
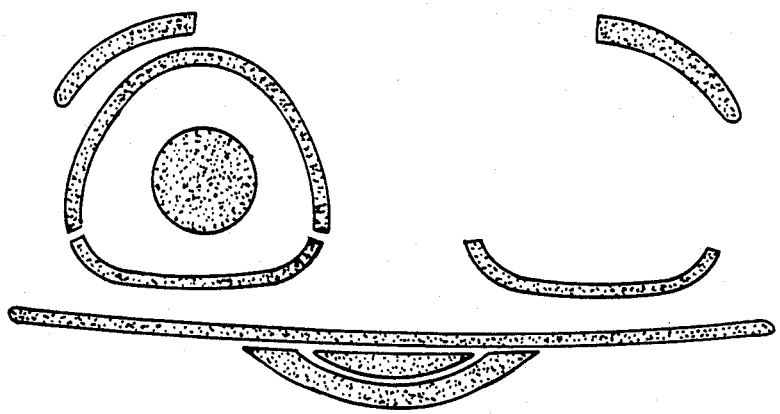
Figure 9:
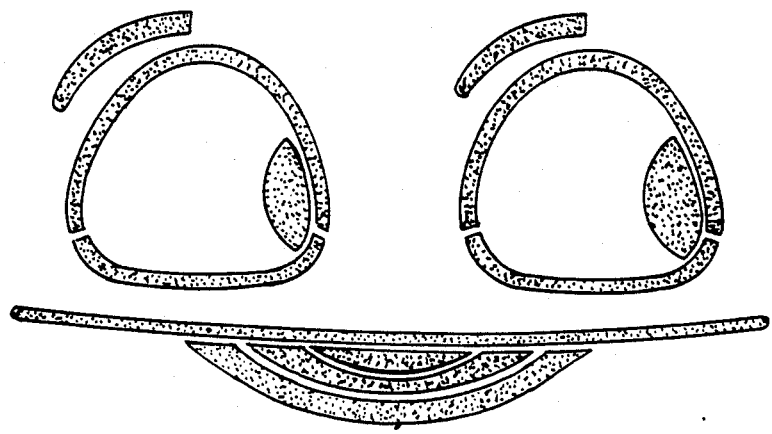

The matrices are electrically connected to corresponding terminals of a printed addressing or driving circuit, schematically shown as 100 in FIG. 3, the connecting members being in the form of elastomeric conductive strips.

Applied voltage effects the changing of the optical characteristics of the composition as it is selectively applied at given points in the display where the eyes, eyebrows and mouth are represented.

Figure 2:
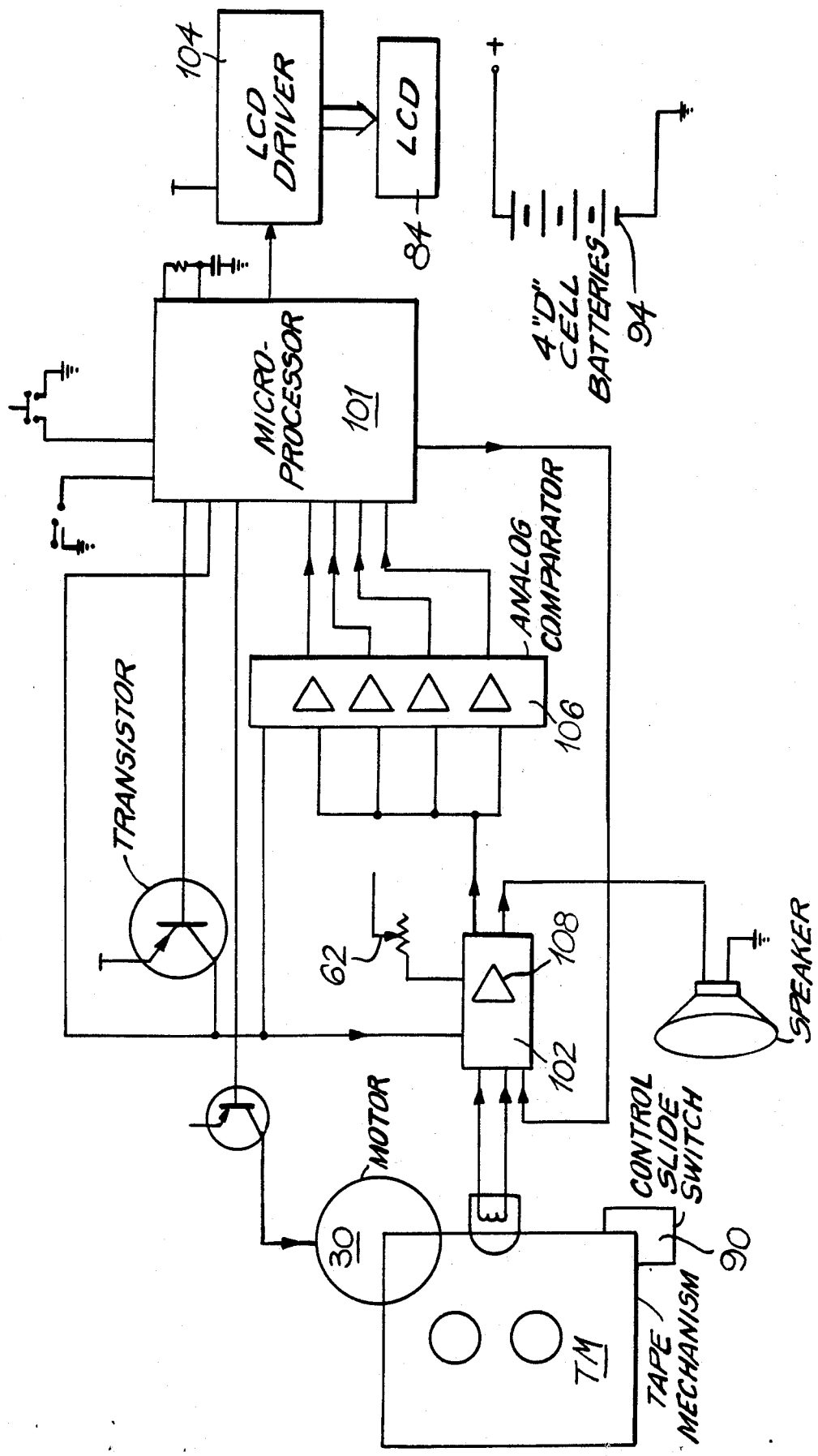
FIG. 2 is a circuit diagram for the apparatus of FIGS. 1A and 1B.

In the circuitry diagram of FIG. 2 are shown the aforedescribed motor 30, speaker 32, transducer 34, LCD 84, and horizontally-shiftable slide switch 90.

Additionally are provided a microprocessor 101 having programmed means for controlling apparatus operation by the turning of motor 30 to on and off positions, by the reading of the output from an amplitude detector 102 in the control of the animation of the mouth of the display resultant from its reading of the tape audio, and by the controlling of LCD driver 104.

An analog comparator 106, connected to audio amplifier 108, provides a four-bit digital representation based upon the voltage level.

Microprocessor 101 reads the digital representation of the audio signal of the tape, delivering in turn signals to driver 104 for driving the LCD with the resultant animated facial expressions which appear to move in synchronization with the words or music generated from the tape.

Microprocessor 101 contains the predetermined program to send electronic signals through the circuitry resulting in the appearance of segments of the display and the movement thereof.

The analog signal is conditioned with electronic components and the comparator is read by the processor at a fast rate to give the moving mouth segments the appearance of synchronization with the speech and/or music on the tape.

Volume control wheel 62 of the tape player also controls the volume into the analog comparator.

Operationally, the tape casette is inserted into the cassette door and the door is closed.

The vertically slidable selector button is then moved to the "ready" position.

The Go push button is depressed to initiate a program consisting of a set of audio tones, a preprogrammed sequence of facial expressions, followed by the starting of the tape mechanism.

The tape mechanism continues to run until a timed pause of a specified duration in the audio signal is encountered. The specified time is 3 seconds in the interaction mode, and 30 seconds in the non-interaction mode.

The interactive mode allows the user to complete any external workbook activity as may be directed by the tape.

Upon completion of the external activity, tape restart may be initiated by actuating the Go switch for a new activity as may be directed by the tape.

In the ready position, the tape can be restarted at any time by pressing the Go push button.

At the end of the tape, the tape mechanism is automatically turned off but the face remains active with the eyes, eyebrows and mouth moving randomly.

After a 3 minute interval of user inattention, the face is caused to follow through a pre-programmed sequence resulting in the seeming eyes-closed configuration.

The cassette is removed by sliding the slide switch to the eject position.

Sliding the vertically slidable selector button to the forward position allows the user to move quickly to another advanced position on the tape.

Facial animation is attained by the turning on and off of the various segments so as to give the appearance of eyes looking upwardly or downwardly or leftward or rightward, of both eyes blinking, or of one eye winking, of eyebrows moving so as to give added emphasis to the eye movements, and of a mouth moving through opening and closing motions.

The eye and eyebrow segments move in pseudo-random patterns with their sequence being varied and the time period of each segment also being varied.

Specific programmed expression sequences are performable under set operating conditions, for instance, at microprocessor start and shut down and where the Go button is activated. In such instances, the random capability is overridden.

The opening and closing of the mouth results from the increasing or decreasing of the number of mouth segments which are turned on. Five mouth levels are provided. The first level, identified a the quiet, non-speaking level, produces a thin, line-like smile. Each succeeeding level forms an ever-increasing U-shaped apparent opening under the thin smile of the first level.

When the tape player is turned on, the microprocessor reads a four level analog comparator, which in turn, outputs four digital signals which can be used to determine the amplitude or loudness of the audio signal being played.

Responding to the four digital signals, the microprocessor will cause the mouth to open at the appropriate level. For instance, if a loud signal is being played, all five mouth segments are turned on. Contrariwise, if a low volume or quiet signal is being played, only a thin smile is displayed. And volume levels between these two noted extremes will be displayed as the intermediate mouth segments.

Filtering is performed on the audio signal so as to lessen the impact of music on the mouth movement, which is to say that voice frequencies are emphasized. It is therebecause that music can be employed for background purposes without effecting the seeming synchronization between mouth and audio.

Power consumption of the microprocessor and display is relatively low so that the face display may be left on at all times.

A stereo jack is located on the side of the housing and allows the inclusion of a microphone so that the user, by speaking through the microphone, can activate the facial movement features via the speaker's own audio. As he speaks, it is amplified and is heard through the speaker.

We claim:

1. An animated display device comprising:
   an audio tape player of cassette type having a recorded audio signal track,
   an animated liquid crystal display and addressing circuitry including a plurality of electrically-conductive matrices arranged in the form of segments representing portions of the eyes and eyebrows and mouth of a human face in different positions suggesting different facial expressions and a driver and driving circuitry having terminals electrically connected to the matrices,
   an amplitude detector for outputting signals according to the reading of the audio signals of the tape,
   an analog comparator connected to the amplitude detector for outputting digital signals according to the amplitude of the audio signals,
   a microprocessor having programmed means for reading the output of the analog comparator and delivering electronic signals to the driver,
   a power source for powering the tape player and microprocessor and amplitude detector,
   a selector button shiftable between a ready operating mode and a fast forward non-playing mode and a stop mode and an eject mode,
   and a housing for accommodating the tape player and liquid crystal display and microprocessor and amplitude detector and power source and selector button,
   all adapted and arranged for the driving of the liquid crystal display by the driver in animating the facial expressions in seeming synchronization with the tape recorded audio on the cassette tape as transcribed by the player with the facial expressions being changeable responsively to the voltage selectively applied at portions of the liquid crystal composition where the eyes and eyebrows and mouth are represented.

* * * * *